(12) United States Patent
Mahasenan et al.

(10) Patent No.: US 12,498,405 B2
(45) Date of Patent: Dec. 16, 2025

(54) SYSTEMS AND METHODS FOR COORDINATING SYNCHRONIZED SAMPLING

(71) Applicant: Apple Inc., Cupertino, CA (US)

(72) Inventors: Arun Vijayakumari Mahasenan, Fremont, CA (US); Venkateswara Rao Manepalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 17/950,675

(22) Filed: Sep. 22, 2022

(65) Prior Publication Data

US 2024/0103054 A1 Mar. 28, 2024

(51) Int. Cl.
   G01R 22/06 (2006.01)
(52) U.S. Cl.
   CPC .................................. G01R 22/063 (2013.01)
(58) Field of Classification Search
   CPC ........ G01R 11/00–66; G01R 22/06–10; H04Q 9/00
   See application file for complete search history.

(56) References Cited

U.S. PATENT DOCUMENTS

| | | | |
|---|---|---|---|
| 2010/0235144 A1* | 9/2010 | Mosberger-Tang | G01D 4/004 709/219 |
| 2010/0289643 A1* | 11/2010 | Trundle | F24F 11/523 340/3.1 |
| 2012/0053869 A1* | 3/2012 | Owen | G01R 21/1333 702/62 |
| 2013/0069949 A1* | 3/2013 | Dembo | G06T 11/206 345/440 |
| 2013/0297087 A1* | 11/2013 | Koster | G06F 1/32 700/297 |
| 2015/0323948 A1* | 11/2015 | Jeong | G05B 15/02 700/291 |
| 2017/0024690 A1* | 1/2017 | Barrenscheen | G01D 5/12 |
| 2021/0003978 A1* | 1/2021 | Kim | G05B 19/042 |

OTHER PUBLICATIONS

U.S. Appl. No. 18/955,381, filed Nov. 21, 2024, Arun Vijayakumari Mahasenan.
U.S. Appl. No. 18/955,560, filed Nov. 21, 2024, Arun Vijayakumari Mahasenan.

* cited by examiner

Primary Examiner — Huy Q Phan
Assistant Examiner — David B Frederiksen
(74) Attorney, Agent, or Firm — FLETCHER YODER PC

(57) ABSTRACT

Systems and methods for coordinating data sampling among devices include a set of electronic devices that may periodically sample energy data from a smart meter according to sample timing information. The sample timing information may specify a set of times to sample energy data for each electronic device. The set of electronic devices may take turns in sampling energy data from the smart meter so that individual electronic devices may reduce power consumption by sampling less frequently. A server may determine the sample times for the electronic devices and may instruct the electronic devices to sample energy data. Additionally, each individual electronic device may leave and/or join wireless communication networks less frequently than if each individual electronic device performed every sample. Accordingly, the coordinated sampling may decrease the radio resource usage and/or bandwidth usage of any individual electronic device.

22 Claims, 6 Drawing Sheets

SYSTEMS AND METHODS FOR COORDINATING SYNCHRONIZED SAMPLING

BACKGROUND

The present disclosure relates generally to wireless communication, and more specifically to the operation of transmitters and receivers in wireless communication devices associated with wireless communication.

An electronic device may transmit and receive data from smart meters that provide energy data, such as energy delivered to a home, energy consumed, power consumption (e.g., total power consumption, daily power consumption, hourly power consumption, and so forth), prices associated with energy and/or power consumption (e.g., total cost, hourly cost, daily cost, and so forth), and the like. Multiple electronic devices may be in close proximity to one another and may simultaneously and/or concurrently attempt to sample energy data. As such, energy data may be sampled inefficiently and may increase power consumption of the electronic devices. Additionally, the electronic devices may utilize separate wireless communication networks for communicating data between electronic devices and sampling energy data from a smart meter. For example, the electronic devices may join a first wireless communication network to sample energy data from the smart meter. Moreover, the electronic devices may leave a second wireless communication network prior to joining the first wireless communication network and sampling the energy data. As such, the electronic devices may occasionally leave the second wireless communication network to sample energy data. Accordingly, sampling of energy data may increase radio resource and/or bandwidth usage.

Additionally, in the electronic device, a transmitter and a receiver may each be coupled to an antenna to enable the electronic device to both transmit and receive wireless signals. A data collision occurs when multiple devices transmit data (e.g., data packets) simultaneously. When a data collision occurs, the transmitted data may often become corrupted, and, in response, the packets that were transmitted may typically be retransmitted at a later time. Because data may be retransmitted, data collisions may lower network performance (e.g., because the time used for retransmitting data could have been used to send new data had the collision not occurred).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to several techniques for coordinating energy data sampling by multiple devices. For example, the devices may distribute sample requests to reduce power consumption for any individual device. Additionally, the techniques may also reduce the occurrence of data collisions, which can occur when multiple devices simultaneously transmit data in the same channel (e.g., frequency range).

In one embodiment, a non-transitory, computer-readable medium includes instructions, that when executed by processing circuitry, cause the processing circuitry to receive a set of electronic devices attributes associated with a set of electronic devices and generate sample timing information based on the set of electronic devices attributes. The sample timing information includes a first set of sample times associated with a first electronic device of the set of electronic devices and a second set of sample times associated with a second electronic device of the set of electronic devices. The instructions also cause the processing circuitry to transmit a first sample signal to the first electronic device of the set of electronic devices based on the sample timing information. The first sample signal causes the first electronic device to sample first energy data from a smart meter. The instructions also cause the processing circuitry to transmit a second sample signal to the second electronic device of the set of electronic devices based on the sample timing information. The second sample signal causes the second electronic device to sample second energy data from the smart meter.

In another embodiment, an electronic device includes a transmitter, a receiver, and a processor coupled to the transmitter and receiver. The processor receives a set of electronic devices attributes, receives, via the receiver, a set of sampling criteria, and performs, via the receiver, a scan for a smart meter based on the set of electronic devices attributes satisfying at least one criterion of the set of sampling criteria. The processor also establishes a connection with the smart meter based on receiving an indication of the smart meter via the scan.

In yet another embodiment, a method includes receiving, via a first electronic device, a shared key associated with a smart meter based on a user profile, establishing a connection between the smart meter and the first electronic device based on the shared key, and transmitting, via the first electronic device, a sample request to the smart meter via the connection.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
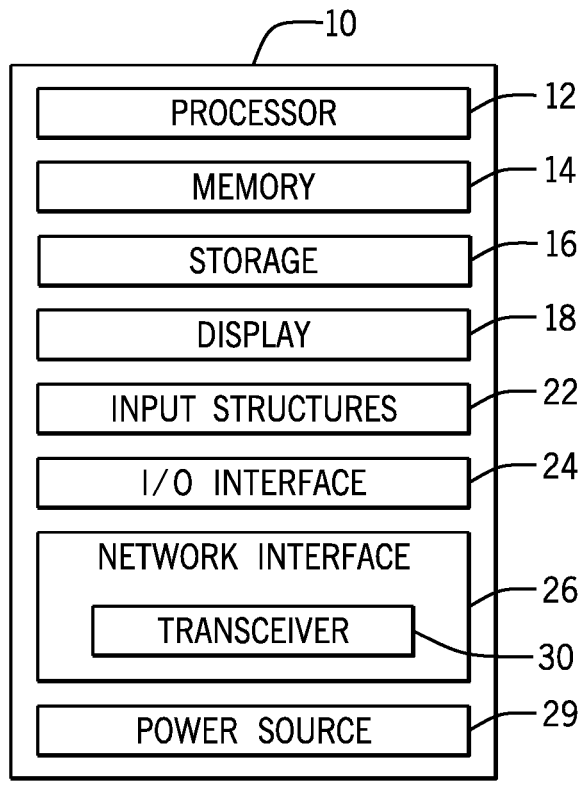
FIG. 1 is a block diagram of electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members. Furthermore, as used herein, a set may include a portion (e.g., a subset, all) of data and/or information. While the data is described herein as including two data sets or three data sets, this is intended to be illustrative of certain embodiments. As such, the data may include any suitable number of data sets (e.g., two data sets, three data sets, four data sets, eight data sets, and so forth). Additionally, as used herein, a first set of electronic devices may include the same electronic device as another set of electronic devices, different electronic device than another set of electronic devices, additional electronic device than another set of electronic devices, fewer electronic device than another set of electronic devices, and so forth.

This disclosure is directed to coordinating data sampling among devices and avoiding data collisions among the devices in a wireless network. An electronic device may transmit and receive energy data from smart meters, such as energy delivered to a home, energy consumed, power consumption, prices associated with energy and/or power consumption, and the like. Multiple electronic devices may be in close proximity to one another, and even be on the same network, and may simultaneously and/or concurrently attempt to sample energy data. As such, energy data may be sampled inefficiently and may increase power consumption of the electronic devices. Additionally, the electronic devices may utilize separate wireless communication networks for communicating data between electronic devices and sampling energy data from a smart meter. For example, the electronic devices may join a first wireless communication network to sample energy data from the smart meter. Moreover, the electronic devices may leave a second wireless communication network prior to joining the first wireless communication network and sampling the energy data. As such, the electronic devices may occasionally leave the second wireless communication network to sample energy data. Accordingly, sampling of energy data may increase radio resource and/or bandwidth usage.

Additionally, data collisions may occur when multiple devices transmit data (e.g., data packets) simultaneously. When a data collision occurs, the transmitted data may often become corrupted, and, in response, the packets that were transmitted may typically be retransmitted at a later time. Because data may be retransmitted, data collisions may lower network performance (e.g., because the time used for retransmitting data could have been used to send new data had the collision not occurred).

Embodiments herein provide various apparatuses and techniques to reduce power consumption and data collisions by coordinating data sampling among devices. To do so, the embodiments disclosed herein include a set of electronic devices that may periodically sample energy data from a smart meter according to sample timing information. The sample timing information may specify a set of times to sample energy data for each electronic device. The set of electronic devices may take turns in sampling energy data from the smart meter so that individual electronic device may reduce power consumption by sampling less frequently. A server may determine the sample times for the electronic devices and may instruct the electronic devices to sample energy data. As such, the server may coordinate sampling and/or may distribute sample times across the set of electronic devices to reduce power consumption of any individual electronic device. Additionally, coordination of the sample times reduces the occurrence of data collisions and may increase network performance. Additionally, each individual electronic device may leave and/or join wireless communication networks less frequently than if each individual electronic device performed every sample. Accordingly, the coordinated sampling may decrease the radio resource usage and/or bandwidth usage of any individual electronic device.

A server may generate the sample timing information based on any number of electronic device available to sample energy data from the smart meter. The electronic device may transmit electronic device attributes to indicate availability for sampling energy data. Moreover, the server may utilize the electronic device attributes to generate the sample timing information. For example, the electronic device may specify a particular time window availability for sampling. The server may generate and/or update the sample timing information to add and/or remove the electronic device from the set of electronic devices used to sample the energy data based on the particular time window. Additionally, the server may utilize battery levels associated with the electronic device to determine availability for sampling. For example, when below a first battery threshold, the server may determine the electronic device has insufficient battery to continue sampling energy data and may remove the electronic device from the set of electronic devices, generate new sample timing information, and/or update sample timing information. Alternatively, when the electronic device is connected to electrical grid, the server may determine the electronic device is available to begin and/or continue sampling energy data. Additionally, the server may determine the electronic device is available to sample energy data more frequently based on battery level meeting or exceeding a second battery threshold and/or connection to the electrical grid.

Moreover, the server may utilize a network signal quality of the electronic device to determine availability for sampling energy data. The network signal quality of the electronic device may be compared to a threshold. When below the threshold, there may be a risk that service is interrupted and energy data may not be sampled and/or transmitted to the server. Furthermore, the server may utilize a usage associated with the electronic device to determine availability and/or timing for sampling energy data. For example, the electronic device may have a high usage due to other processing and/or computing tasks at a first time. As such, the server may determine the electronic device is unavailable or increase a sampling period (e.g., decrease sampling frequency) for the electronic device based on the usage meeting or exceeding a first usage threshold. Additionally or alternatively, the electronic device may have a low usage at a second time. The server may determine the electronic device is available to begin sampling or decrease a sampling period for the electronic device based on the usage falling below a second usage threshold.

Additionally or alternatively, the server may utilize a location and/or a network connection associated with the electronic device to determine availability and/or timing for sampling energy data. For example, the electronic device may enter a geofence associated with the smart meter and/or may be within a threshold distance of the smart meter such that the electronic device may establish a connection with the smart meter for sampling data. Moreover, the electronic device may join a network associated with the smart meter.

Furthermore, a machine learning model may analyze user attributes to determine availability and/or timing for sampling energy data. The machine learning model may be trained based on training data including past sampling times, past sampling periods, past usage, past time windows for sampling, past network connections, and the like. For example, the machine learning model may determine particular time windows associated with lower usage for the electronic device and may generate sample timing information to begin sampling and/or decrease the sampling period for the electronic device within that particular time window.

Embodiments herein also provide apparatuses and techniques to reestablish connections to smart meters for sampling energy data. To do so, the embodiments disclosed herein include a shared key that may be associated with a user profile. The shared key may permit access to the smart meter to allow electronic device to sample energy data. The set of electronic devices may utilize access credentials to authenticate the electronic device with the user profile and receive the shared key. Additionally, the electronic device may utilize attributes and sampling criteria to dynamically scan for nearby smart meters. As an example, the set of sampling criteria may include a location criterion. The location criterion may indicate whether the electronic device is located within a particular geographic area and/or within a threshold distance from a known location of a smart meter. Moreover, the set of sampling criteria may include a network connection criterion that may indicate any number of acceptable network connections for electronic device. The electronic device may receive information including a list of active network connections and may compare the list with the acceptable network connections. The electronic device may scan for smart meters based on a correlation between the list of active network connections and the list of acceptable network connections.

Keeping the foregoing in mind, FIG. 1 is a block diagram of electronic device 10 (e.g., a mobile electronic device), according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), a smart speaker, home automation equipment (including, but not limited to switches, outlets, controllers, irrigation or sprinkler system equipment, sensors, lights, thermostats), wireless (or wired) routers, network extenders, or power equipment (e.g., controllers, power storage devices, solar panels)), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a low-rate wireless PAN (LR-WPAN) or an ultra-wideband (UWB) or a BLUETOOTH® network, a local area network (LAN) or wireless local area network (WLAN), such as a network employing one of IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
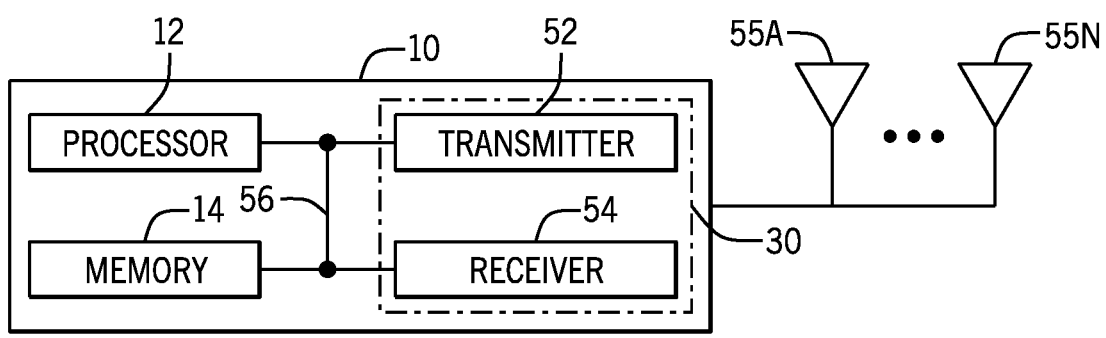
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
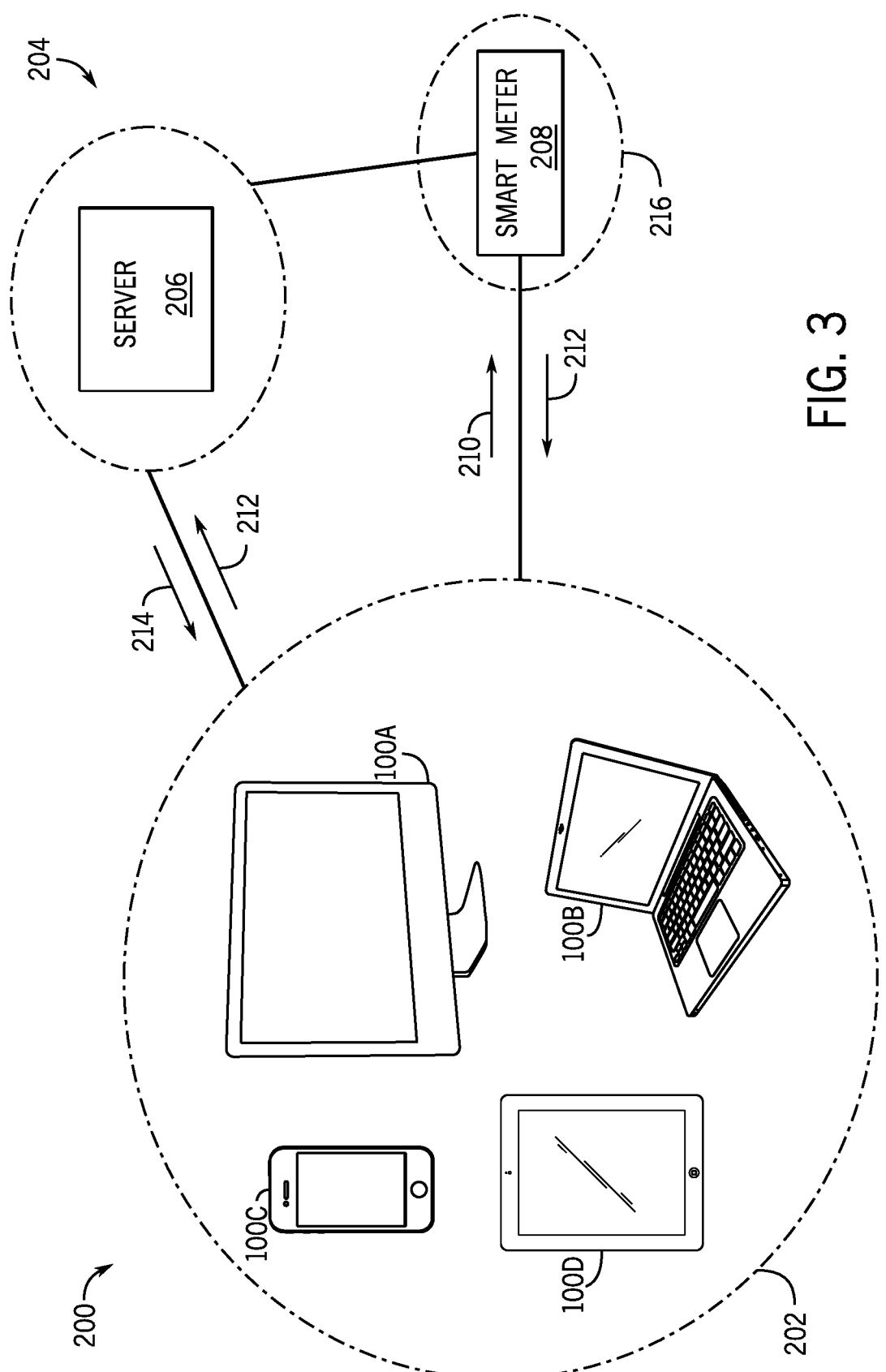
FIG. 3 is a schematic diagram of a wireless network in which the electronic device of FIG. 1 may be connected, according to embodiments of the present disclosure.

FIG. 3 is a schematic diagram of a wireless network 200 including a set of electronic devices 202. The electronic devices 10 may be communicatively coupled to a wireless network 200. In particular, the wireless network 200 may include a LR-WPAN, and, even more particularly, a Thread network. While the techniques described herein may be described with respect to the Thread network, it should be noted that the techniques may be utilized with other types of wireless networks, including, but not necessarily limited to, any IEEE Standard 802.15.4 network. For example, the techniques of the present disclosure may be utilized in wireless mesh networks, which generally refers to wireless networks that utilize a mesh topology. For instance, wireless mesh networks may follow a WLAN topology in which nodes (e.g., devices connected to the mesh network) connect directly, dynamically, and non-hierarchically to other nodes (e.g., as many nodes as possible) and cooperate with one another to route data to and from devices. Wireless mesh networks include, but are not limited to, IEEE Standard 802.15.4 networks.

Figure 5:
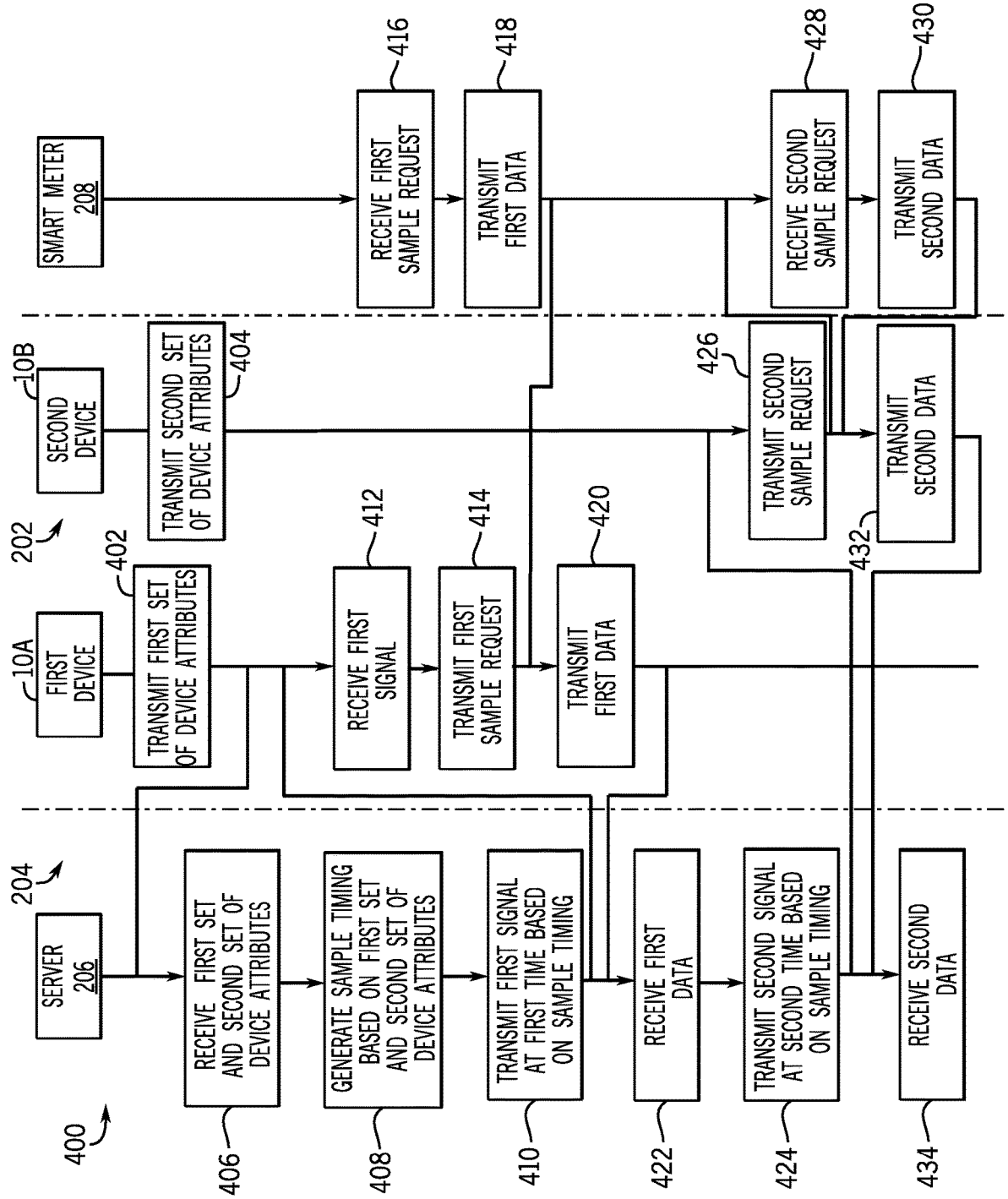
FIG. 5 is a flowchart of a method to coordinate sampling requests using the set of electronic devices of FIG. 3, according to embodiments of the present disclosure.

The wireless communication network 200 includes several nodes (e.g., end devices 100A, 100B, 100C, 100D (collectively referred to as end devices 100)) that are connected to one another as illustrated in FIG. 5. Each of the nodes is an electronic device (e.g., 10) included in the wireless network 200. In certain embodiments, the wireless network 200 may include several types of nodes. Depending on what particular device the electronic device 10 is (or the capabilities of the electronic device 10), the electronic device 10 may be one or more of any of the types of nodes. The types of nodes included in the wireless network 200 may include routers ((e.g., routers that are not further classified as discussed below), thread leader, and border router) and end devices 100. Routers are nodes that forward packets for network devices, provide secure commissioning services for devices attempting to join the wireless communication network, and keep their transceiver(s) enabled at all times. End devices 100 are nodes that do not forward packets for other network devices, communicate (primarily) with a single router, and may disable their transceiver(s) to reduce power. As discussed below, routers and some end devices 100 may also be classified as full Thread devices, while other end devices may be classified as minimal Thread devices. A full Thread device may always have its radio on, maintain IPv6 address mappings, and subscribe to an all-routers multicast address. Minimal Thread devices may not subscribe to the all-routers multicast address and forward their messages to a router (or an end device 100 that is functioning as a router).

Within the classification of routers, there may be several types of routers. For example, a router may be a thread leader, which manages the other routers in the wireless network 200. A router may also be a border router, which is a device that can forward data to a second wireless communication network 204, such as a network other than a Thread network (e.g., a Wi-Fi® network). Routers may include full Thread devices.

Within the classification of end devices 100, there are router eligible end devices, full end devices, minimal end devices, and sleepy end devices. Router eligible end devices and full end devices are full Thread devices. More specifically, router eligible end devices are end devices 100 that can be promoted to function as a router, while full end devices are end devices 100 that are full Thread devices but cannot be promoted to be a router. Minimal end devices and sleepy end devices are minimal Thread devices. In particular, a minimal end device does not need to poll for messages sent from the router to which the minimal end device is connected, and the minimal end device's transceiver is always on. A sleepy end device is an end device that is typically in sleep and wakes up occasionally to poll for messages from the router to which it is connected.

The wireless network 200 may be implemented indoors (e.g., within a dwelling or office space), outdoors, or both.

The nodes may include electrical devices including, but not limited to, the electronic devices listed above that the electronic device 10 may be. For instance, the nodes (which include the electronic device 10) may be a phone, tablet, computer, a portable electronic or handheld electronic, a wearable electronic device, a smart speaker, home automation equipment (including, but not limited to switches, outlets, controllers, irrigation or sprinkler system equipment, sensors, lights, thermostats), wireless routers, network extenders, or power equipment), or any combination thereof.

The second wireless communication network 204 may include an application server 206. The application server 206 may include any suitable electronic device (e.g., a desktop personal computer, a laptop, a mobile electronic device, a tablet, a smartphone, a wearable device, or any other suitable computing device) and may include at least some of the components of the electronic device 10 shown in FIGS. 1 and 2, including one or more processors 12, the memory 14, the storage 16, the transceiver 30, the transmitter 52, and the receiver 54. The second wireless communication network 204 may include any suitable number of application servers 206 (e.g., one or more application servers 206, four or more application servers 206, and so on).

The set of electronic devices 202 may include any number of electronic devices. Each electronic device may include any suitable electronic device and may be an example of the electronic device 10 shown in FIGS. 1 and 2. As such, each of the electronic device may include at least some of the components of the electronic device 10, such as one or more processors 12, the memory 14, the storage 16, the transceiver 30, the transmitter 52, and the receiver 54. Each of the electronic devices 10 may be communicatively coupled to the second wireless communication network 204.

Additionally or alternatively, each of the electronic devices 10 may be communicatively coupled to a third wireless network 216. For example, the electronic devices 10 may establish a connection with the third wireless network 216. The third wireless network 216 may provide access for the set of electronic devices 202 to sample energy data and/or information from the smart meter 208. In particular, the third wireless network 216 may include a LR-WPAN, and, even more particularly, a Zigbee network. While the techniques described herein may be described with respect to the Zigbee network, it should be noted that the techniques may be utilized with other types of wireless networks, including, but not necessarily limited to, any IEEE Standard 802.15.4 network. The smart meter 208 may also be communicatively coupled to the third wireless network 216. The smart meter 208 may receive and/or monitor energy data, such as energy consumption over a specific time frame, energy pricing, instantaneous power consumption, average power consumption over a specific time frame, and the like. In certain embodiments, the smart meter 208 may include a component of a smart appliance. The smart meter 208 may be communicatively coupled to an electrical grid to receive and/or monitor the energy data. The electronic devices 10 may sample energy data provided by the smart meter 208 via the third wireless network 216. In certain embodiments, the electronic devices 10 may establish a connection with the smart meter 208 via the third wireless network 216. For example, any number of the electronic devices 10 may transmit a sample request 210 to the smart meter 208. The smart meter 208 may receive the sample request 210 and may transmit energy data 212 to the requesting electronic device 10.

The second wireless communication network 204 may provide access for the set of electronic devices 202 to transfer energy data and/or information to and from the application server 206. The electronic devices 10 may transmit the sampled energy data 212 to the server 206 via the second wireless communication network 204. In certain embodiments, the electronic devices 10 may transmit any number of electronic device attributes associated with the set of electronic devices 202 to the server 206. The server 206 may receive a set of electronic device attributes and may generate and/or transmit sample timing information 214 to the set of electronic devices 202. For example, the sample timing information 214 may include specific sample times for each electronic device 10 of the set of electronic devices 202. In some embodiments, the server 206 may transmit the sample timing information 214 to the set of electronic devices 202 and each electronic device 10 may utilize the sample timing information to determine when to sample energy data from the smart meter 208. As such, the server 206 may coordinate sampling and/or may distribute sample times across the set of electronic devices 202 to reduce power consumption of any individual electronic device 10. Accordingly, the distributed sample times may also reduce the occurrence of data collisions.

Additionally or alternatively, the sample timing information 214 may include a respective sample period associated with each electronic device 10. For example, the sample timing information may include a first sample time for the first end device 100A and a first sample period associated with the first end device 100A. The server 206 may transmit the first sample time to the first end device 100A and/or may instruct the first end device 100A to sample energy data at the first sample time. After sampling the energy data at the first sample time, the server 206 and/or the first end device 100A may determine an elapsed time from the first sample time. Once the elapsed time meets or exceeds the first sample period, the server 206 may instruct the first end device 100A to sample energy data at a second sample time. In certain embodiments, the server 206 may instruct the first end device 100A to sample energy data periodically based on the first sample period. The sample periods may differ for each electronic device 10 within the set of electronic devices 202. For example, the first sample period associated with the first end device 100A may be greater than, less than, or equal to a second sample period associated with the second end device 100B. Moreover, the server 206 may receive energy data sampled by the set of electronic devices 202. The server 206 may also aggregate and/or store energy data received from the set of electronic devices 202.

The electronic devices 10 may include a single transceiver 30 and may utilize the transceiver 30 for transmission and receipt of wireless signals (e.g., radio frequency signals) based on the connection with the first wireless communication network 200, the second wireless communication network 204, and/or the third wireless communication network 216. The server 206 may instruct the electronic devices 10 to terminate a first connection with the first wireless communication network 200 and/or to establish a second connection with the third wireless communication network 216. For example, the server 206 may transmit one or more sampling signals to one or more corresponding electronic devices 10 at one or more corresponding times to sample energy data from the smart meter 208. The electronic devices 10 may receive the sampling signals and the sampling signals may cause the electronic devices 10 to terminate the connection with the first wireless network 200 and/or establish the connection with the third wireless network 216. Additionally or alternatively, the electronic devices 10 may terminate the connection with the third wireless network 216 and/or may re-establish the connection with the first wireless network 200 after sampling the energy data from the smart meter 208.

In some embodiments, the electronic devices 10 may utilize the same transceiver 30 for transmission and receipt of wireless signals for the first wireless communication network 200, the second wireless communication network 204, and/or the third wireless communication network 216. For example, the server 206 may instruct the electronic device 10 to sample energy data from the smart meter 208. In some embodiments, the electronic device may leave the first communication network 200 based on the instruction. Additionally, the electronic device 10 may join the third wireless communication network 216 based on the instruction. The electronic device 10 may also sample energy data from the smart meter 208 via the third wireless communication network 216. Additionally, each individual electronic device 10 may leave and/or join wireless communication networks 200, 216 less frequently than if each individual electronic device 10 performed every sample. Accordingly, the coordinated sampling may decrease the radio resource usage and/or bandwidth usage of any individual electronic device 10.

Figure 4:
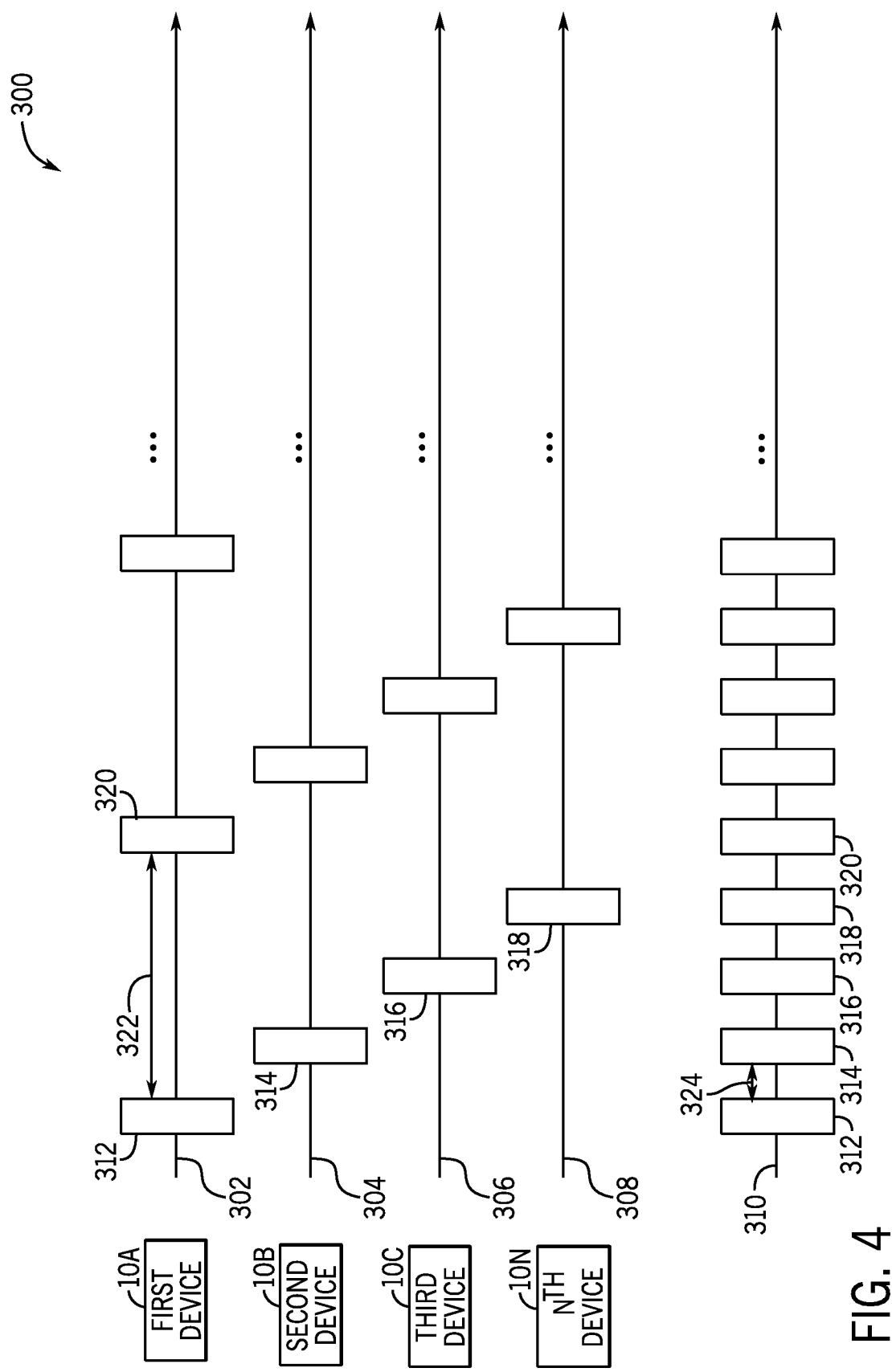
FIG. 4 is a timing diagram of sample requests of the set of electronic devices of FIG. 3, according to embodiments of the present disclosure.

With the foregoing in mind, FIG. 4 is a timing diagram 300 of sample signals of the set of electronic devices 202, according to embodiments of the present disclosure. A first sample signal 302 may be associated with the first electronic device 10A and may be generated based on the sample timing information 214. The first sample signal 302 may include any number of sample requests 210. For example, the first sample signal 302 may include a first sample request 312 at a first time. The set of electronic devices 202 may include any number of electronic devices 10. As such, any number of sample signals may be associated with the set of electronic devices 202 and may be generated based on the sample timing information 214. For example, a second sample signal 304 may be associated with the second electronic device 10B, a third sample signal 306 may be associated with the third electronic device 10C, and an Nth sample signal 308 may be associated with an Nth electronic device 10N.

The second sample signal 304 may include a second sample request 314, the third sample signal 306 may include a third sample request 316, and the Nth sample signal 308 may include an Nth sample request 318. Each electronic device 10 may transmit the corresponding sample request at a specified time indicated by the sample timing information 214 and/or based on a signal transmitted by the server 206. The first sample signal 302 may also include a N+1th sample request 320. The first sample request 312 and the N+1th sample request 320 may be separated by a first sample period 322. The first sample period 322 may begin after transmission of the first sample request 312 and may end at transmission of the N+1th sample request 320. As such, the server 206 may instruct the first electronic device 10A to transmit the N+1th sample request 320 after the first sample period 322 expires. In certain embodiments, each sample signal may include a corresponding sample period. Additionally, a first set of sample periods may be the same or may differ (e.g., greater than the first set of sample periods, less than the first set of sample periods) from a second set of sample periods. In some embodiments, the first sample period 322 may include a dynamic sample period. The server 206 may update the first sample period 322 based on a set of user attributes associated with the first electronic device 10A. For example, if a usage of the first electronic device 10A increases, the server 206 may generate updated sample timing information 214 that decreases the frequency (e.g. increases the first sample period 322) of sampling for the first electronic device 10A to reduce resource and/or power consumption for the first electronic device 10A. As such, the server 206 may coordinate sampling and/or may distribute sample times across the set of electronic devices 202 to reduce power consumption of any individual electronic device 10. Additionally, each individual electronic device 10 may leave and/or join wireless communication networks 200, 216 less frequently than if each individual electronic device 10 performed every sample. Accordingly, the coordinated sampling may decrease the radio resource usage and/or bandwidth usage of any individual electronic device 10.

A coordinated sample signal 310 may include all the sample requests transmitted by the set of electronic devices 202 and/or received by the smart meter 208. The coordinated sample signal 310 may also include a coordinated sample period 324. The coordinated sample period 324 may be less than any individual sample period associated with the sample signals 302, 304, 306, 308. Accordingly, energy data may be sampled more frequently from the smart meter 208 by utilizing the set of electronic devices 202 to distribute sample requests. In certain embodiments, the coordinated sample period 324 may include a dynamic sample period. For example, the coordinated sample period 324 may differ between the first sample request 312 and the second sample request 314 and between the second sample request 314 and the third sample request 316.

With the foregoing in mind, FIG. 5 is a flowchart of a method 400 to coordinate sampling requests using the set of electronic devices 202 of FIG. 3, according to embodiments of the present disclosure. Any suitable device (e.g., a controller) that may control components of the wireless network 200, the second wireless communication network 204, the application server 206, the set of electronic devices 202, and the electronic device 10, such as one or more respective processors 12 of these devices, may perform the method 400. In some embodiments, the method 400 may be implemented by executing instructions stored in a tangible, non-transitory, computer-readable medium, such as the one or more respective memories 14 or storages 16 of these devices, using the processors 12. For example, the method 400 may be performed at least in part by one or more software components, such as one or more respective operating systems of the wireless network 200, the second wireless communication network 204, the application server 206, the set of electronic devices 202, the electronic devices 10, one or more software applications of the wireless network 200, the second wireless communication network 204, the application server 206, the set of electronic devices 202, the electronic devices 10 and the like. While the method 400 is described using steps in a specific sequence, it should be understood that the present disclosure contemplates that the described steps may be performed in different sequences than the sequence illustrated, and certain described steps may be skipped or not performed altogether.

At block 402 and block 404, the first electronic device 10A may transmit a first set of electronic device attributes and the second electronic device 10B may transmit a second set of electronic device attributes. The set of electronic devices attributes may include a geographic location associated with the electronic device 10, a usage associated with the UE, a preferred time window associated with the electronic device 10, a geographic area associated with the electronic device 10, a battery level associated with the electronic device 10, a network signal quality associated with the electronic device 10, a list of current network connections associated with the electronic device 10, electronic device capabilities (e.g., communication capabilities, computing and/or processing capabilities, sensing capabilities, and so forth), and the like. The server 206 may receive (block 406) the first set and the second set of electronic device attributes from the first electronic device 10A and the second electronic device 10B, respectively.

The server 206 may generate (block 408) sample timing information based on the first set and the second set of electronic device attributes. The sample timing information may include a first set of sample times and a first sample period associated with the first electronic device 10A and may also include a second set of sample times and a second sample period associated with the second electronic device 10B. The server 206 may transmit (block 410) a first signal to the first electronic device 10A at a first time based on the sample timing. For example, the first set of sample times may include the first time. The first electronic device 10A may receive (block 412) the first signal and may transmit (block 414) a first sample request in response to receiving the first signal. Additionally or alternatively, the server 206 may transmit the sample timing information to the first electronic device 10A and/or the second electronic device 10B. As such, the first electronic device 10A may transmit the first sample request at the first time based on the sample timing information.

The smart meter 208 may receive (block 416) the first sample request from the first electronic device 10A. In certain embodiments, the first sample request may cause the smart meter 208 to transmit (block 418) first energy data. The first energy data may include any energy data collected between the first sample request and a most recent sample request. Additionally or alternatively, the first energy data may include any energy data collected within a specified time frame, such as the past hour, the past 24 hours, the current day, the current hour, the current week, and so forth. The first electronic device 10A may receive the first energy data and may transmit (block 420) the first energy data to the server 206. The server 206 may receive (block 422) the first energy data and may perform additional processing of the first energy data to identify energy usage habits, peak energy consumption times, peak energy consumption days, peak energy consumption devices, and the like.

The server 206 may transmit (block 424) a second signal to the second electronic device 10B at a second time based on the sample timing information. For example, the second set of sample times may include the second time. The second electronic device 10B may receive the second signal and may transmit (block 426) a second sample request in response to receiving the second signal. Additionally or alternatively, the server 206 may transmit the sample timing information to the second electronic device 10B. As such, the second electronic device 10B may transmit the second sample request at the second time based on the sample timing information. Additionally or alternatively, the server 206 may transmit the first set of sample times to the first electronic device 10A and the second set of sample times to the second electronic device 10B.

The smart meter 208 may receive (block 428) the second sample request from the second electronic device 10B. In certain embodiments, the second sample request may cause the smart meter 208 to transmit (block 430) second energy data. The second energy data may include any energy data collected between the first sample request and the second sample request. Additionally or alternatively, the second energy data may include any energy data collected within a specified time frame. The second electronic device 10B may receive the second energy data and may transmit (block 432) the second energy data to the server 206. The server 206 may receive (block 434) the second energy data. As such, the server 206 may coordinate sampling and/or may distribute sample times across the set of electronic devices 202 to reduce power consumption of any individual electronic device 10.

In certain embodiments, the server 206 may adjust an operational mode associated with a smart appliance based on the first energy data, the second energy data, or both. Additionally or alternatively, the server 206 may generate and/or transmit notifications to one or more of the electronic devices 10 based on the first energy data, the second energy data, or both. For example, the server 206 may identify an appliance or device within a home that is consuming abnormal amounts of energy based on a usage history. The server 206 may transmit notifications to assist a user in reducing power consumption and/or saving costs associated with power consumption. Additionally or alternatively, the server 206 may transmit notifications based on a pricing and/or cost of energy. For example, the server 206 may transmit a notification based on the cost of energy exceeding a threshold cost, such as a user-specified threshold cost. As such, the server 206 may assist the user in reducing power consumption to save costs.

In some embodiments, the electronic devices 10 may individually establish connections with the smart meter 208 via the third wireless communication network 216. Each individual electronic device 10 may receive a corresponding key or access credentials that may be utilized to authenticate the electronic device 10 and permit access to the smart meter 208. In certain embodiments, the set of electronic devices 202 may utilize a shared key to establish connections with the smart meter 208. The first electronic device 10A may associate the shared key with a user profile. The second electronic device 10B may be authenticated based on access credentials associated with the user profile and may receive the shared key based on the authentication. The second electronic device 10B may then utilize the shared key to establish a connection with the smart meter 208 and sample energy data from the smart meter 208.

Figure 6:
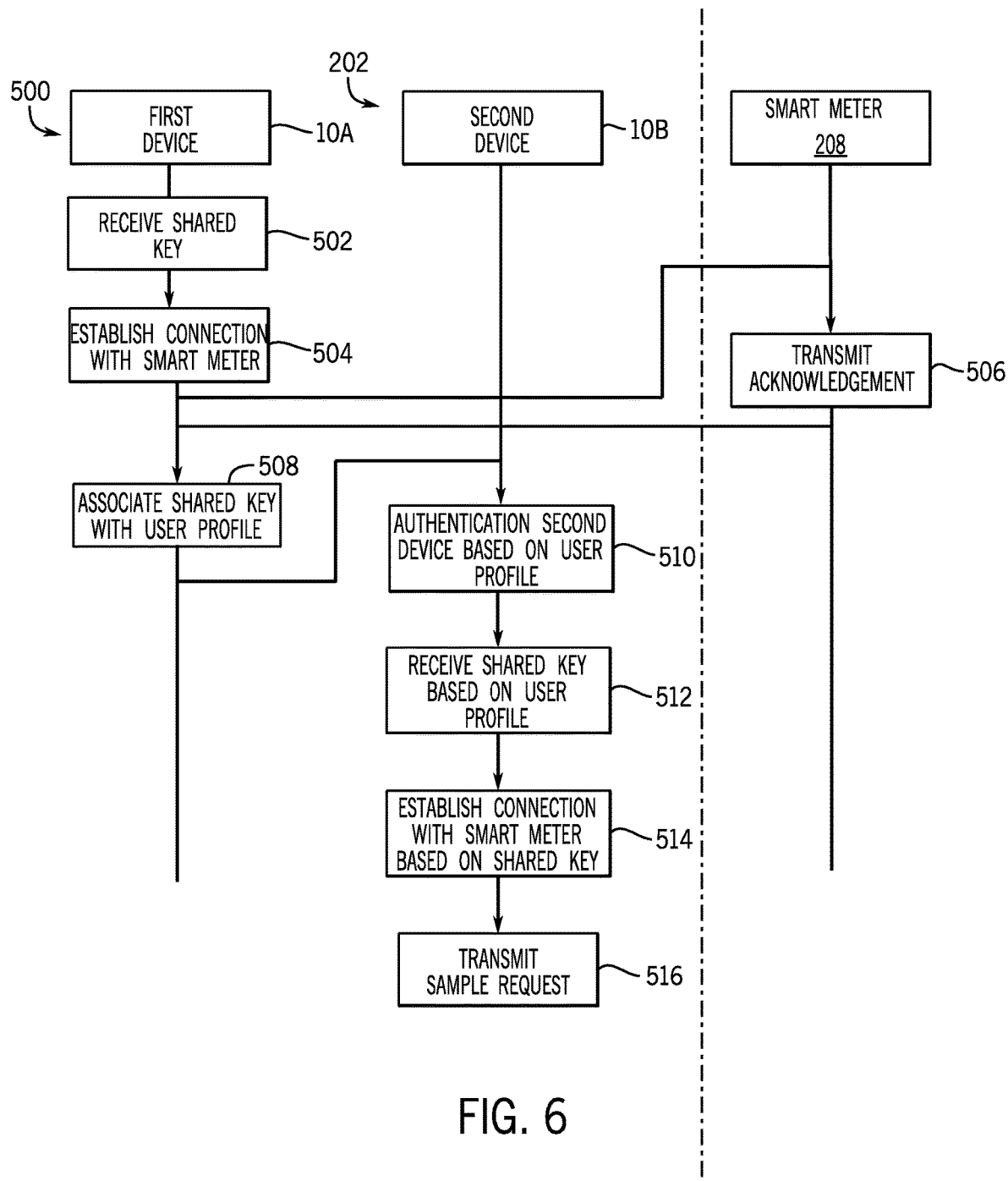
FIG. 6 is flowchart of a method to establish connections between the set of electronic devices of FIG. 3 and a smart meter.

With the foregoing in mind, FIG. 6 is a flowchart of a method 500 to establish connections between the set of electronic devices 202 and the smart meter 208, according to embodiments of the present disclosure. Any suitable device (e.g., a controller) that may control components of the wireless network 200, the second wireless communication network 204, the application server 206, the set of electronic devices 202, and the electronic device 10, such as one or more respective processors 12 of these devices, may perform the method 500. In some embodiments, the method 500 may be implemented by executing instructions stored in a tangible, non-transitory, computer-readable medium, such as the one or more respective memories 14 or storages 16 of these devices, using the processors 12. For example, the method 500 may be performed at least in part by one or more software components, such as one or more respective operating systems of the wireless network 200, the second wireless communication network 204, the application server 206, the set of electronic devices 202, the electronic devices 10, one or more software applications of the wireless network 200, the second wireless communication network 204, the application server 206, the set of electronic devices 202, the electronic devices 10 and the like. While the method 500 is described using steps in a specific sequence, it should be understood that the present disclosure contemplates that the described steps may be performed in different sequences than the sequence illustrated, and certain described steps may be skipped or not performed altogether.

At block 502, the first electronic device 10A may receive a shared key that may be utilized to establish a connection with the smart meter 208 and/or access the smart meter 208 to sample energy data. In some embodiments, the first electronic device 10A may receive the shared key based on authenticating the first electronic device 10A with a vendor associated with the smart meter 208, a manufacturer associated with the smart meter 208, an energy provider associated with the smart meter 208, and the like. The first electronic device 10A may establish (block 504) a connection with the smart meter 208 based on the shared key. At block 506, the smart meter 208 may transmit an acknowledgment indicative of the connection between the smart meter 208 and the first electronic device 10A.

The first electronic device 10A may associate (block 508) the shared key with a user profile. In certain embodiments, any number of electronic device 10 of the set of electronic devices 202 may utilize the user profile to authenticate the respective electronic device 10 and access, transmit, and/or receive data associated with the user profile. Once authenticated, the first electronic device 10A may transmit the shared key for storage, such as at the application server 206, a storage device associated with the second wireless communication network 204, a cloud-based storage device, and the like. Additional electronic devices 10 may receive and/or retrieve the shared key from storage. Additionally or alternatively, the first electronic device 10A may store the shared key in memory 14 and/or storage 16.

At block 510, the second electronic device 10B may perform an authentication process to access data, such as the shared key, associated with the user profile. For example, the second electronic device 10B may transmit access credentials associated with the user profile. The second electronic device 10B may receive (block 512) the shared key based on authenticating the second electronic device 10B with the user profile. The second electronic device 10B may utilize the shared key to establish a connection (block 514) with the smart meter 208. The second electronic device 10B may also transmit (block 516) a sample request to sample energy data from the smart meter 208 after establishing the connection with the smart meter 208.

In certain embodiments, the electronic devices 10 may include portable electronic devices. A signal strength of the respective connection between any of the electronic devices 10 and the smart meter 208 may decrease or deteriorate based on movement of the electronic devices 10 away from the smart meter 208. For example, the smart meter 208 may be located within or adjacent a home and any number of the electronic devices 10 may occasionally leave a coverage area of the smart meter 208 and disconnect from the smart meter 208. As such, the electronic devices 10 may rejoin the coverage area at a later time and may reconnect and reestablish a connection with the smart meter 208. In certain embodiments, the electronic devices 10 may scan for nearby smart meters 208. However, scanning may increase power consumption and may reduce battery levels of the electronic devices 10. Accordingly, the electronic devices 10 may evaluate a set of sampling criteria to determine appropriate times and/or locations for performing a scan for nearby smart meters 208.

Figure 7:
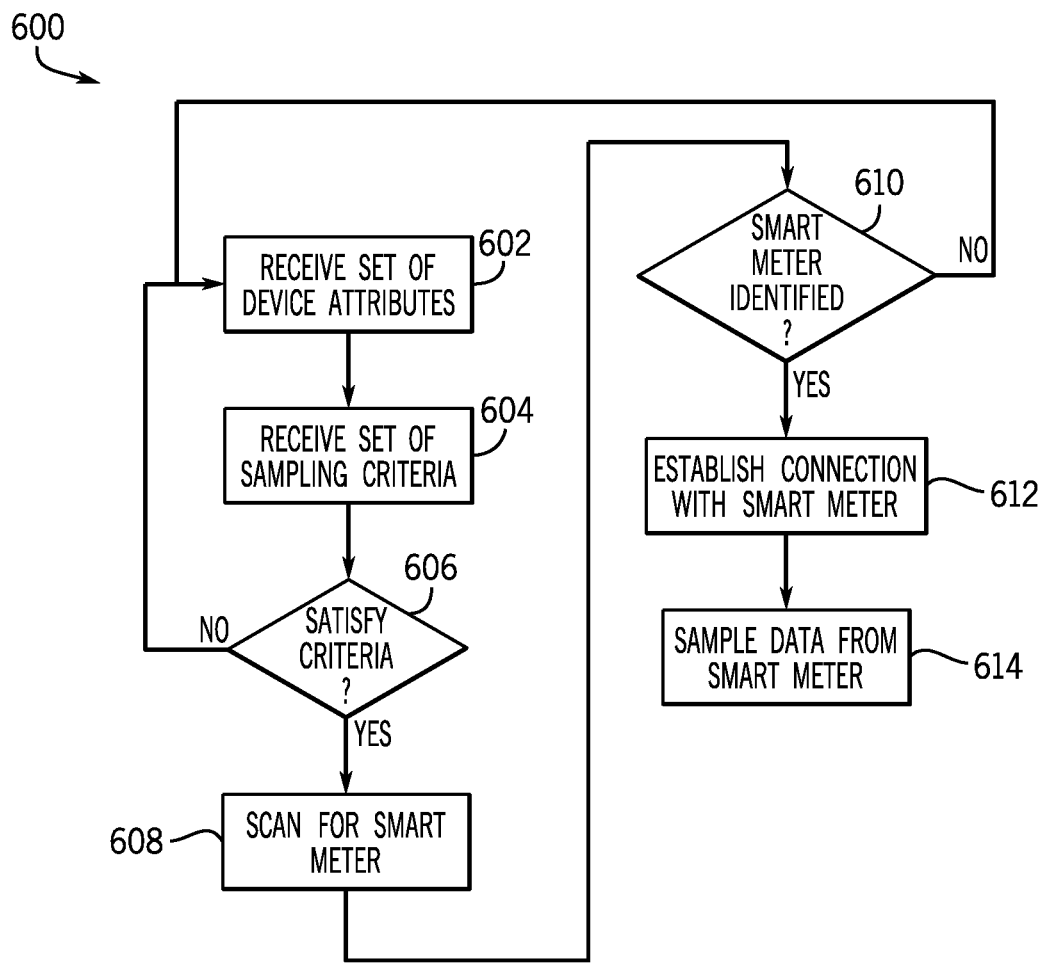
FIG. 7 is a flowchart of a method to scan for smart meters using the electronic device of FIG. 1, according to embodiments of the present disclosure.

With the foregoing in mind, FIG. 7 is a flowchart of a method 600 to scan for smart meters 208 using the electronic device 10, according to embodiments of the present disclosure. Any suitable device (e.g., a controller) that may control components of the wireless network 200, the second wireless communication network 204, the application server 206, the set of electronic devices 202, and the electronic device 10, such as one or more respective processors 12 of these devices, may perform the method 600. In some embodiments, the method 600 may be implemented by executing instructions stored in a tangible, non-transitory, computer-readable medium, such as the one or more respective memories 14 or storages 16 of these devices, using the processors 12. For example, the method 600 may be performed at least in part by one or more software components, such as one or more respective operating systems of the wireless network 200, the second wireless communication network 204, the application server 206, the set of electronic devices 202, the electronic devices 10, one or more software applications of the wireless network 200, the second wireless communication network 204, the application server 206, the set of electronic devices 202, the electronic devices 10 and the like. While the method 600 is described using steps in a specific sequence, it should be understood that the present disclosure contemplates that the described steps may be performed in different sequences than the sequence illustrated, and certain described steps may be skipped or not performed altogether.

At block 602, the electronic device 10 may receive a set of electronic devices attributes. The set of electronic devices attributes may include a geographic location associated with the electronic device 10, a geographic area associated with the electronic device 10, a battery level associated with the electronic device 10, a network signal quality associated with the electronic device 10, a list of current network connections associated with the electronic device 10, electronic device capabilities (e.g., communication capabilities, computing and/or processing capabilities, sensing capabilities, and so forth), and the like. The electronic device 10 may utilize various criteria for scanning for and/or establishing a connection with the smart meter 208. At block 604, the electronic device 10 may receive a set of sampling criteria. The set of sampling criteria may include a particular geographic area associated with the smart meter 208, such as a geofence, a particular time window, a threshold distance from the smart meter 208, a list of networks associated with the smart meter 208, a threshold battery level, and the like.

The electronic device 10 may determine whether any number of the set of electronic device attributes satisfy the set of sampling criteria (e.g., one criterion, a threshold number of criterion, the set of sampling criteria, and so forth). In certain embodiments, the electronic device 10 may determine whether any of the set of sampling criteria are satisfied. If no electronic device attributes satisfy the sampling criteria (NO path of block 606), the electronic device 10 may return to block 602 to receive an updated set of electronic device attributes. If the electronic device attributes satisfy the sampling criteria (YES path of block 606), the electronic device 10 may perform a scan (block 608) for the smart meter 208. By performing the scan, the electronic device 10 may identify (block 610) any number of smart meters 208 within a coverage area. If the scan identifies at least one smart meter 208 (YES path of block 610), the electronic device 10 may establish (block 612) a connection with the smart meter 208. The electronic device 10 may also sample (block 614) data from the smart meter 208 based on a sample request. For example, the electronic device 10 may transmit the sample request to the smart meter 208 and may receive energy data based on the sample request. The sample request may cause the smart meter 208 to transmit the energy data to the electronic device 10. If no smart meters 208 are identified based on the scan (NO path of block 610), the electronic device 10 may return to block 602 to receive an updated set of electronic device attributes and/or may return to block 608 to perform a second scan after an elapsed period of time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A non-transitory, computer-readable medium comprising instructions, that when executed by processing circuitry, cause the processing circuitry to:
 receive a set of electronic devices attributes associated with a set of electronic devices;
 generate sample timing information based on the set of electronic devices attributes, wherein the sample timing information comprises a first set of sample times associated with a first electronic device of the set of electronic devices and a second set of sample times associated with a second electronic device of the set of electronic devices;
 transmit a first sample signal to the first electronic device of the set of electronic devices based on the sample timing information, wherein the first sample signal causes the first electronic device to sample first energy data from a smart meter; and
 transmit a second sample signal to the second electronic device of the set of electronic devices based on the sample timing information, wherein the second sample signal causes the second electronic device to sample second energy data from the smart meter.

2. The non-transitory, computer-readable medium of claim 1, wherein the sample timing information comprises a first sample period associated with the first electronic device.

3. The non-transitory, computer-readable medium of claim 2, wherein the instructions, when executed, cause the processing circuitry to:
 determine an elapsed time from transmission of the first sample signal; and
 transmit a third sample signal to the first electronic device based on the elapsed time meeting or exceeding the first sample period, wherein the third sample signal causes the first electronic device to sample third energy data from the smart meter.

4. The non-transitory, computer-readable medium of claim 2, wherein the sample timing information comprises a second sample period associated with the second electronic device.

5. The non-transitory, computer-readable medium of claim 4, wherein the instructions, when executed, cause the processing circuitry to:
determine a second elapsed time from transmission of the second sample signal; and
transmit a fourth sample signal to the second electronic device based on the elapsed time meeting or exceeding the second sample period, wherein the fourth sample signal causes the second electronic device to sample fourth energy data from the smart meter.

6. The non-transitory, computer-readable medium of claim 1, wherein the first energy data comprises an energy consumption associated with the smart meter, a pricing associated with the energy consumption, or both.

7. The non-transitory, computer-readable medium of claim 1, wherein the set of electronic devices attributes comprises a usage associated with a respective electronic device of the set of electronic devices, a time window associated with the respective electronic device, a location of the respective electronic device, or any combination thereof.

8. The non-transitory, computer-readable medium of claim 1, wherein the instructions, when executed, cause the processing circuitry to:
receive a second set of electronic devices attributes associated with the set of electronic devices; and
generate second sample timing information based on the second set of electronic devices attributes, wherein the sample timing information comprises a first sample period associated with the first electronic device and the second sample timing information comprises a second sample period associated with the first electronic device.

9. The non-transitory, computer-readable medium of claim 8, wherein:
the set of electronic devices attributes comprises a first usage associated with the first electronic device;
the second set of electronic devices attributes comprises a second usage associated with the first electronic device;
the first usage is greater than the second usage; and
the first sample period is greater than the second sample period.

10. The non-transitory, computer-readable medium of claim 1, wherein the instructions, when executed, cause the processing circuitry to:
receive a second set of electronic devices attributes associated with a second set of electronic devices, wherein the set of electronic devices differs from the set of electronic devices; and
generate second sample timing information based on the second set of electronic devices attributes, wherein the sample timing information comprises a third set of sample times associated with the first electronic device, a fourth set of sample times associated with the second electronic device, and a fifth set of sample times associated with a third electronic device of the second set of electronic devices.

11. The non-transitory, computer-readable medium of claim 1, wherein the sample timing information comprises a first sample period associated with the first electronic device and a second sample period associated with the second electronic device and wherein the first sample period differs from the second sample period.

12. The non-transitory, computer-readable medium of claim 1, wherein the first sample signal causes the first electronic device to:
terminate a first connection with a first wireless network associated with the set of electronic devices; and
establish a second connection with a second wireless network associated with the smart meter.

13. An electronic device comprising:
a transmitter;
a receiver;
processing circuitry coupled to the transmitter and the receiver, the processing circuitry configured to:
cause the receiver to receive one or more electronic device attributes associated with a set of electronic devices;
generate sample timing information based on the one or more electronic device attributes;
cause the transmitter to transmit a first sample signal to a first electronic device of the set of electronic devices based on the sample timing information to cause the first electronic device to sample first energy data from a smart meter; and
cause the transmitter to transmit a second sample signal to a second electronic device of the set of electronic devices based on the sample timing information to cause the second electronic device to sample second energy data from the smart meter.

14. The electronic device of claim 13, wherein the sample timing information comprises a first sample period associated with the first electronic device.

15. The electronic device of claim 14, wherein the processing circuitry is configured to:
determine an elapsed time from transmission of the first sample signal; and
cause the transmitter to transmit a third sample signal to the first electronic device based on the elapsed time meeting or exceeding the first sample period to cause the first electronic device to sample third energy data from the smart meter.

16. The electronic device of claim 14, wherein the sample timing information comprises a second sample period associated with the second electronic device.

17. The electronic device of claim 16, wherein the processing circuitry is configured to:
determine an elapsed time from transmission of the second sample signal; and
cause the transmitter to transmit a fourth sample signal to the second electronic device based on the elapsed time meeting or exceeding the second sample period to cause the second electronic device to sample fourth energy data from the smart meter.

18. The electronic device of claim 13, wherein the one or more electronic device attributes comprise a location associated with a respective electronic device of the set of electronic devices, a usage associated with the respective electronic device, a time window associated with the respective electronic device, or any combination thereof.

19. A method to be performed by processing circuitry comprising:
receiving a first set of electronic device attributes associated with a first electronic device and a second set of electronic device attributes associated with a second electronic device;

generating sample timing information based on the first set of electronic device attributes and the second set of electronic device attributes;

causing a transmitter to transmit a first sample signal to the first electronic device based on the sample timing information to cause the first electronic device to sample first energy data from a smart meter; and causing the transmitter to transmit a second sample signal to the second electronic device based on the sample timing information to cause the second electronic device to sample second energy data from the smart meter.

20. The method of claim 19, wherein the sample timing information comprises a first set of sample times and a first sample period associated with the first electronic device and a second set of sample times and a second sample period associated with the second electronic device.

21. The method of claim 20, wherein the first sample period differs from the second sample period.

22. The method of claim 20, comprising causing the transmitter to transmit, the first set of sample times to the first electronic device and the second set of sample times to the second electronic device.

\* \* \* \* \*